Feb. 14, 1950 G. J. VERMEER 2,497,333
DUMP VEHICLE

Filed March 12, 1948 2 Sheets-Sheet 1

INVENTOR
Gary J. Vermeer
By Rudolph L. Lowell
Atty.

Feb. 14, 1950     G. J. VERMEER     2,497,333
DUMP VEHICLE

Filed March 12, 1948     2 Sheets-Sheet 2

INVENTOR
Gary J. Vermeer

Patented Feb. 14, 1950

2,497,333

UNITED STATES PATENT OFFICE 2,497,333

DUMP VEHICLE

Gary J. Vermeer, Pella, Iowa

Application March 12, 1948, Serial No. 14,559

1 Claim. (Cl. 298—19)

This invention relates generally to dump vehicles and in particular to a dump attachment for a farm wagon.

An object of this invention is to provide an improved dump wagon.

A further object of this invention is to provide a dump attachment for a farm wagon which is easily assembled on farm wagons now in common use and adapted to support the wagon box for tilting movement.

Still another object of this invention is to provide a dump attachment for a wagon having a dump frame for supporting the wagon box in which a lift mechanism for the dump frame is adapted to be operated on advance of the tractor relative to the wagon.

A feature of this invention is found in the provision of a dump attachment for a wagon in which a main frame is supported on the front and rear bolsters of the wagon. A dump frame, pivoted at the rear end of the main frame, has the front end thereof guidably supported for up and down movement on an upright frame, forming part of the dump frame lift mechanism and carried at the front end of the main frame.

A further feature of this invention is found in the provision of a dump attachment for a wagon in which a dump frame, tiltably mounted on a main frame, is raised and lowered by means including an upright frame, arranged at the front end of the main frame, and a cable movably supported on the upright frame and the dump frame having one end attached to the upright frame and an opposite end extended outwardly from about a guide pulley arranged on the main frame forwardly of the upright frame. By applying a pulling force on the extended end of the cable, the dump frame is raised and lowered. The guide pulley is supported on a bracket which is pivotally supported on the main frame for movement in a horizontal plane whereby the pulling force on the cable can be applied in directions both forwardly and transversely of the wagon.

Further objects, features and advantages of this invention will appear from the following description when taken in connection with the accompanying drawings, in which:

Fig. 4 is an enlarged fragmentary sectional view taken along the line 4—4 in Fig. 2.

Figure 1:
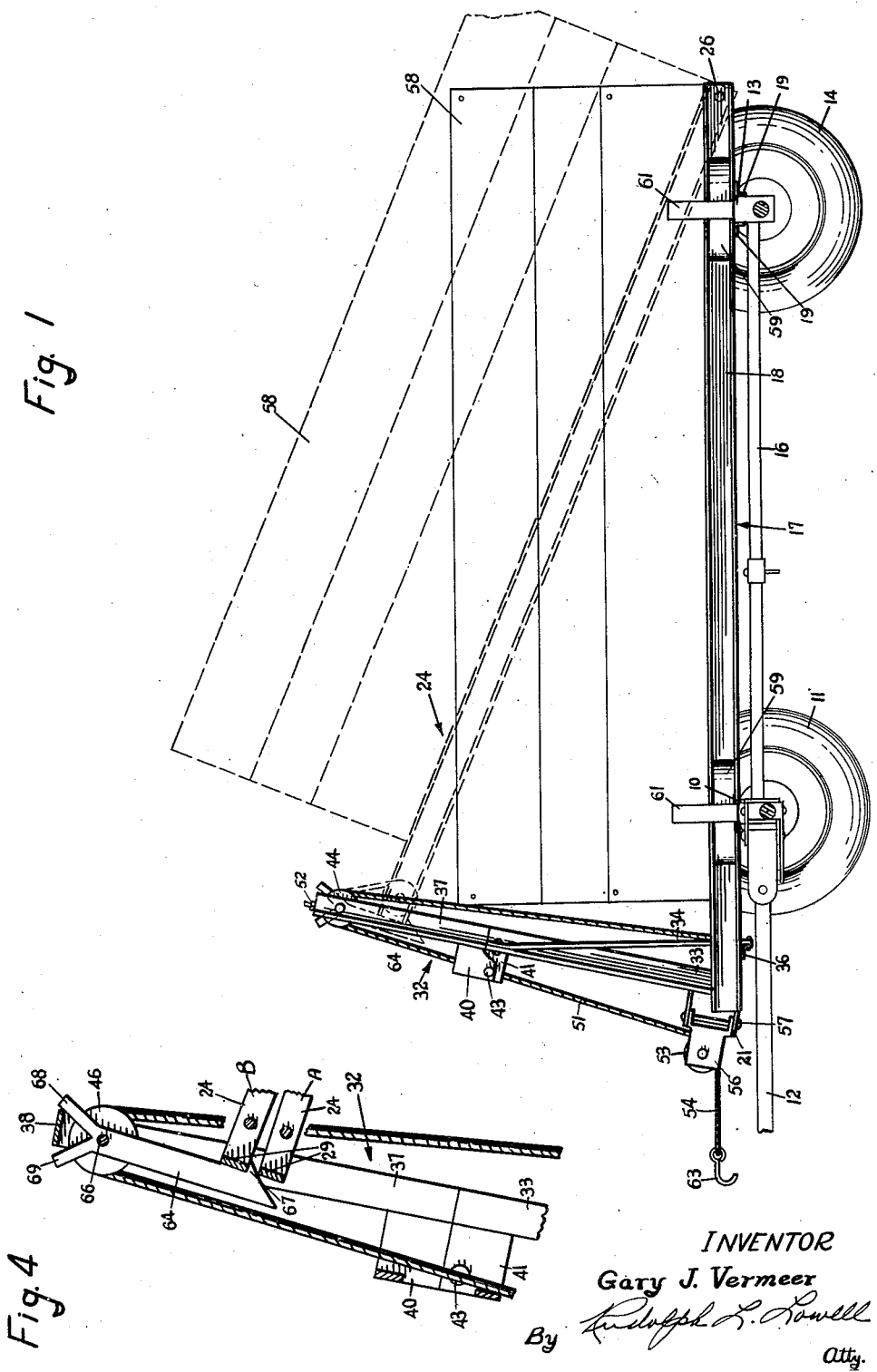
Fig. 1 is a side elevational view of the dump attachment of this invention shown in assembly relation with a usual farm wagon, with parts of the wagon being removed and shown in section to more clearly show such assembly.

With reference to the drawings, the dump attachment of this invention is illustrated in Fig. 1 in assembly relation with a usual farm wagon having a front bolster 10, front wheels 11, a tongue 12, a bolster 13 and rear wheels 14. The bolsters 10 and 13 are connected together by an adjustable reach 16.

The dump attachment (Figs. 1 and 2) includes a main frame, indicated generally as 17, of a substantially rectangular shape having longitudinal side members 18 of a channel iron construction and faced outwardly. Adjacent their rear ends, the side members 18 are connected together by a pair of spaced transverse angle members 19 which are secured to the undersides of the frame members 18. The front ends of the side members 18 are connected together by a transverse angle member 21.

Figure 3:
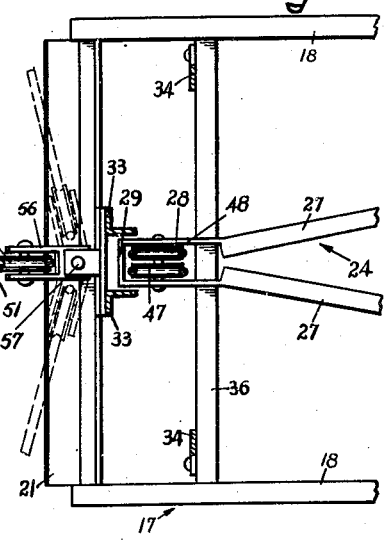
Fig. 3 is a fragmentary sectional plan view of the front end portion of the attachment as seen on the line 3—3 in Fig. 2.

A dump or tiltable frame, indicated generally as 24, is of a substantially triangular shape and has a base comprised of a rod or shaft 26 which is pivotally supported between the rear ends of the side members 18 of the main frame 17. The side members 27 of the dump frame 24 are of a channel iron construction, faced inwardly toward each other, and having their legs cut away at the front end or apex 28 of the dump frame. As best appears in Fig. 3, the front ends of the side members 27 are connected together by a flat plate or catch member 29 so that the apex 28 is of an open frame construction of a generally rectangular shape. A brace member 31, of an angle iron construction, is connected between the side members 27 at a position spaced forwardly from their rear ends.

The dump frame 24 is raised and lowered by a hoist or lift mechanism which includes an upright frame, indicated generally as 32, and arranged at the forward end of the main frame 17. The upright frame 32 is of a foldable construction and includes a stationary base section comprised of a pair of upright members 33 of an angle iron construction oppositely arranged in a transversely spaced relation and having their lower ends secured, as by welding, to the front member 21. Brace members 34, for the uprights 33, are connected between the top ends of the uprights 33, and a transverse support 36 connected between the lower sides of the main frame side members 18 at a position spaced rearwardly from the front member 21.

The pivoted or foldable section of the upright frame 32 includes a pair of side members 37 arranged in a spaced relation corresponding to the spaced relation of the upright members 33 and connected across their upper ends by a spacer plate 38. The lower ends of the side members 37 are connected together by a hinge member 40, of a substantially U-shape, which projects forwardly of the upright frame 32 with the rear ends of its legs 39 secured, as by welding, to the front sides of the members 37. A second hinge member 41, of a substantially U-shape, also projects forwardly from the upright frame 32 and has the rear ends of its legs 42 connected, as by welding, to the front sides of the upright members 33. Adjacent corresponding legs 39 and 42 are provided with associated overlapping extensions which are pivoted together by rivets or pins 43. The upper or pivoted section of the upright frame 32, therefore, is thus pivotally movable or foldable in a forward direction to a position in which it is hung or supported from the pivots 43, as best appears in Fig. 5. The pivoted section of the upright frame is maintained in a position in longitudinal alignment with the base section of the upright frame by the abutting engagement of the adjacent ends of the uprights 33 and members 37.

Figure 2:
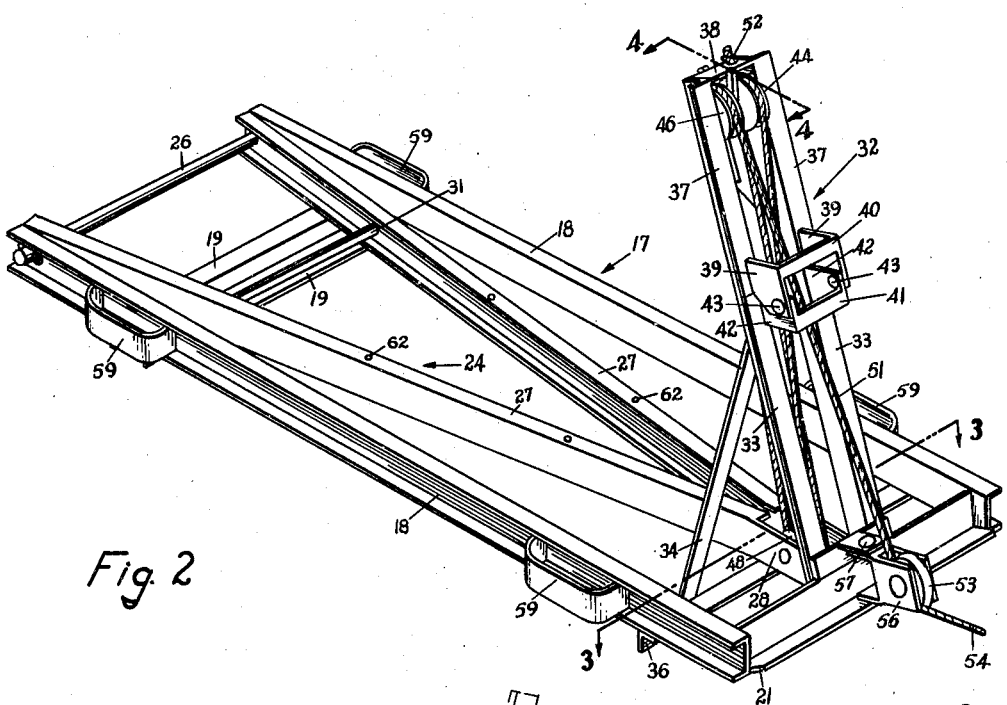
Fig. 2 is a perspective view of the dump attachment.
Figure 5:
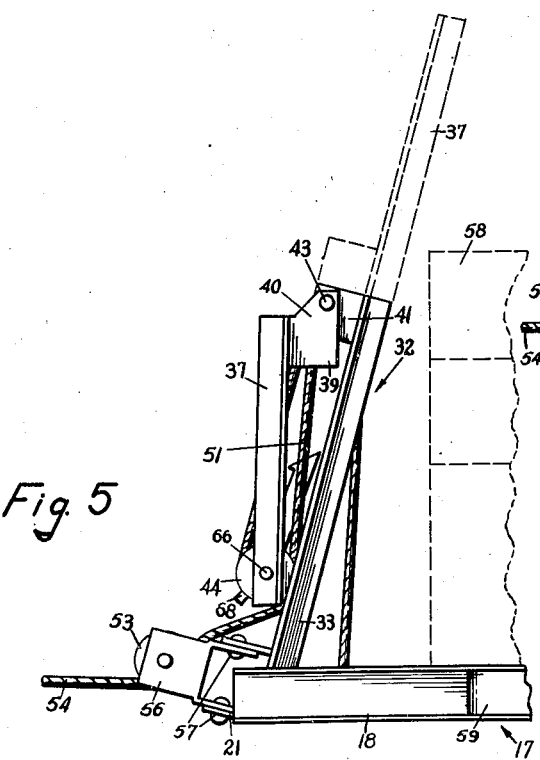
Fig. 5 is an enlarged fragmentary side elevational view of the front end portion of the assembly shown in Fig. 1, showing the lift mechanism of the attachment in a transport position.

Referring to Figs. 2 and 5, it is seen that the upright frame 32 is inclined upwardly and rearwardly. Further, from a consideration of Fig. 3, it is seen that the apex 28 of the dump frame 24 is movable between the spaced uprights 33 and the correspondingly spaced members 37. The arc of pivotal movement of the apex 28 of the dump frame, corresponds substantially to the angle of inclination of the upright frame 32 so that, on a lifting movement of the dump frame, the apex 28 is guidably retained between the members 33 and 37 for all moved positions of the dump frame. The apex 28 and members 33 and 37 thus define coacting portions for guidably supporting the up and down movement of the dump frame 24, whereby to hold the dump frame 24 against movement transversely of the main frame 17.

A pair of coaxially aligned pulleys 44 and 46 (Fig. 2) are rotatably supported on a shaft 66, carried between the upper ends of the members 37, so as to be arranged within the space between the members 37. A second pair of pulleys 47 and 48 are rotatably supported within the apex 28 of the dump frame 24. A cable 51 (Figs. 2 and 3) has one end 52 attached to the spacer plate 38 and from such end extends downwardly about the pulley 47, upwardly for travel about the pulley 44, downwardly for travel about the pulley 48 and then upwardly again for travel about the pulley 46. From the pulley 46 the cable 51 extends downwardly for travel about a pulley 53 which is arranged at the front end of the main frame 17 at a position forwardly of the upright frame 32. The cable end 54 extends forwardly or outwardly away from the pulley 53.

The pulley 53 is rotatably supported in a bracket 56 which is pivotally supported at 57 on the front connecting member 21 for pivotal movement in a horizontal plane. With the application of a pulling force on the cable end 54, the dump frame 24 is elevated.

In the assembly of the dump attachment with a usual farm wagon, the wagon box 58 (Fig. 1) is initially removed from the wagon. The main frame 17 is then extended between and supported on the bolsters 10 and 13, with the transverse members 19 arranged at opposite sides of the rear bolster 13 to hold the attachment against longitudinal movement relative to the wagon. Oppositely arranged pairs of laterally projected members 59 at the front and rear ends of the main frame side members 18 are engageable with the upright guides 61 for the wagon box 58 to hold the main frame 18 against movement transversely of the wagon. It is contemplated that the lower sides of the box extend over the projections 59 to avoid any interference of the usual bolts (not shown) at such sides, with the frame members 18.

With the attachment thus supported on the wagon, the wagon box 58 is mounted on the dump frame 24 and then secured thereto by bolts (not shown) extended through the floor of the wagon box and through holes 62 provided in the side members 27 of the dump frame.

In the operation of the attachment assume the upright frame 32 to be in its extended position shown in Fig. 1, and the wagon box 58 in its lowered position shown in full lines in the same figure. To raise or tilt the wagon box 58, the tractor or pulling unit (not shown) is disconnected from the wagon tongue 12 and a hook 63 at the cable end 54 is connected with the tractor drawbar (not shown). With the wagon wheels 11 or 14 suitably blocked, the tractor is advanced relative to the wagon. On this advance of the tractor the cable 51 is extended forwardly of the wagon and the cable lengths between the pulleys 44 and 46, and 47 and 48 are shortened whereby the dump frame 24 and wagon box 58 are moved upwardly to their dotted line positions shown in Fig. 1.

The dump frame 24 is releasably locked in its raised position, shown in dotted lines in Fig. 1, by the provision of means including a gravity actuated latch 64 (Figs. 1 and 4) which is arranged between the pulleys 44 and 46 and pivotally supported on the shaft 66 for such pulleys. The latch 64 extends downwardly from between the pulleys 44 and 46 and is formed at its lower end with a hook member 67 adapted for releasable engagement with the under side of the catch member 29 at the apex 28 of the dump frame 24.

The upper end of the latch 64 is formed with a pair of diverging arms or bifurcations 68 and 69 of a length adapted to straddle the spacer plate 38 at the top of the upright frame 32. When the upright frame 32 is in its extended position, the arm 68 is engageable with one side of the spacer plate 38 to hold the latch 64, against the action of gravity, in a position for engaging the catch member 29.

On raising of the dump frame 24 to its position shown at A in Fig. 4, the catch member 29 engages the under side of the hook 67 and moves the latch 64 in a clockwise direction, as viewed in Fig. 4. When the dump frame 24 reaches its position shown at B in Fig. 4, the hook 67 is moved, by the action of gravity, into an engaging position with the catch member 29 so as to lock the dump frame 24 against downward movement. To lower the frame 24, it is initially raised out of engagement with the hook 67 and the latch 64 is then manually moved in a counterclockwise direction, as viewed in Fig. 4, to in turn move the hook 67 out of an engaging position with the catch member 29.

The dump frame 24 in its lowered position is positively supported by its resting engagement on the transverse members 19 and 36, which members constitute stops for limiting the downward pivotal movement of the dump frame 24 to a position substantially within the plane of the main frame 18.

When the wagon is in transport, the pivoted or foldable section of the upright frame 32 is moved to its position shown in Fig. 5. At this position those portions of the cable 51 between the pulleys 44 and 46, and 47 and 48, are supported on the base section of the U-member 41 to maintain the cable 51 in assembly relation with such pulleys. Thus on an extension of the pivoted section of the upright frame 32 to its dotted line position shown in Fig. 5, the hoist mechanism of the attachment is ready for operation.

In the folded position of the pivoted section of the upright frame 32, the arms 68 and 69 of the latch 64 are engageable with the spacer member 38 to hold the latch in substantially the plane of the members 37, with the hook member 67 positioned upwardly.

From a consideration of the above description it is seen that the invention provides a dump attachment for a wagon which is of a compact and rugged construction, and capable of being easily and quickly installed on farm wagons of a general type now in commercial use. The lift mechanism for the dump frame 24 is readily movable into its operating position and is directly operated by connection of the cable end 54 with a tractor and the advance of the tractor relative to the wagon. As best appears in Fig. 5, when the pivoted section of the upright frame 32 is folded, the complete frame 32 is below the top level of the wagon box 58. Thus when the wagon is used for harvesting corn, the upright frame 32 is entirely free of the usual wagon elevators provided on corn pickers. It is further apparent that wagon boxes of different sizes can be assembled on the dump frame 24 without in any way interfering with the dumping efficiency of the attachment.

Although the invention has been described with respect to a preferred embodiment thereof, it is to be understood that it is not to be so limited since changes and modifications can be made therein which are within the full intended scope of this invention, as defined by the appended claim.

I claim:

A dump wagon comprising, a main frame, a dump frame pivotally mounted at the rear end of said main frame for tilting movement, means for tilting said dump frame including an upright frame at the front end of said main frame having a pair of transversely spaced upright members, a first pulley means adjacent the top of said upright frame, a second pulley means adjacent the front end of said dump frame, a third pulley means on said main frame arranged forwardly of said upright frame, a flexible lifting means movably supported on said three pulley means having one end attached to said upright frame and an opposite end extended outwardly from said third pulley means to provide for a lifting of said dump frame in response to a pulling force on said opposite end of the lifting means, means for releasably locking said dump frame in a raised position therefor including a catch member on the front end of said dump frame, a gravity actuated latch member pivotally supported at the top of said upright frame for pivotal movement between said spaced upright members, and a transverse stop member on said upright frame engageable with said latch to limit its pivotal movement in one direction at a position for engaging said catch member, said latch member, on lifting of said dump frame, being initially engaged and moved by said catch member in an opposite direction and then moved by gravity into said catch engaging position to lock said dump frame against downward movement.

GARY J. VERMEER.

REFERENCES CITED

The following references are of record in the file of this patent:

UNITED STATES PATENTS

| Number | Name | Date |
| --- | --- | --- |
| 976,389 | Nelson | Nov. 22, 1910 |
| 994,718 | Bushnell | June 13, 1911 |
| 1,343,283 | Sanderson | June 15, 1920 |
| 1,357,279 | Denny | Nov. 2, 1920 |
| 2,444,808 | Coats | July 6, 1948 |